United States Patent [19]

Evans

[11] Patent Number: 5,218,073

[45] Date of Patent: Jun. 8, 1993

[54] POLYHYDROXY URETHANES FORMED BY REACTION OF REDUCED SUGARS AND ORGANIC DIISOCYANATES

[75] Inventor: William L. Evans, Turnersville, N.J.

[73] Assignee: E. I. Du Pont de Nemours and Compaany, Wilmington, Del.

[21] Appl. No.: 597,405

[22] Filed: Oct. 15, 1990

[51] Int. Cl.⁵ .............................................. C04G 18/30
[52] U.S. Cl. ...................................... 528/73; 528/75; 528/76; 528/85; 525/453; 568/704; 568/705
[58] Field of Search ...................... 528/73, 75, 76, 85, 528/26; 524/27; 525/456, 458, 453; 568/704, 705

[56] References Cited

U.S. PATENT DOCUMENTS

| 4,021,405 | 5/1977 | Tucker et al. | 525/456 |
| 4,206,299 | 6/1980 | Yamazaki et al. | 528/26 |
| 4,507,458 | 3/1985 | Shiraki et al. | 528/49 |
| 4,740,534 | 4/1988 | Matsuda et al. | 528/76 |
| 5,028,642 | 7/1991 | Goodrich et al. | 524/27 |

Primary Examiner—John Kight, III
Assistant Examiner—John M. Cooney, Jr.

[57] ABSTRACT

Polyhydroxy urethanes prepared from reduced sugars of the formula $C_xH_{2(x+1)}O_x$ where x is 4, 5 and 6 and diisocyanates are disclosed. There is a molar excess of 1.5 and preferably 2.0 of the reduced sugar in the polyhydroxy urethane product and the molecular weight of the product is generally less than 1,500 and preferably less than 1,000.

17 Claims, No Drawings

POLYHYDROXY URETHANES FORMED BY REACTION OF REDUCED SUGARS AND ORGANIC DIISOCYANATES

FIELD OF THE INVENTION

The present invention relates to stabilizers for spandex polymers to improve resistance to discolorization induced by exposure to fumes and/or ultraviolet light. The stabilizers are polyhydroxy urethanes formed by reaction of reduced sugars and organic diisocyanates.

BACKGROUND OF THE INVENTION

USSN 07/477,738 filed Feb. 9, 1990 by Charles William Goodrich and William Lewis Evans discloses the use of the polyhydroxyurethanes of the present invention as stabilizers in spandex polymers (LP-2785A).

SUMMARY OF THE INVENTION

The present invention relates to the reaction product of a large stoichiometric excess of reduced sugar having the formula $$C_xH_{2(x+1)}O_x$$

where x is 4, 5 or 6 with an organic diisocyanate (i.e. excess of hydroxyl groups over isocyanate groups). The preferred product is the reaction product of sorbitol and 1,3-bis(1-isocyanato-1-methylethyl)benzene (m-TMXDI).

DETAILED DESCRIPTION

The composition of the present invention find use as stabilizers for spandex polymers which generally are fibers made from a long chain synthetic polymer that contains at least 85% by weight segmented polyurethane. The polyurethane has "soft segments" and "hard segments", which refer to specific portions of the polymer chain. The soft segments are the portions of the polymer chain that can be derived from polyethers or polyesters. The hard segments are the portions of the spandex polymer chain that are desired from the reaction of an isocyanate and a diamine or diol chain extender.

Reduced sugars suitable for use in the present invention are prepared by reducing the aldehyde groups or the ketone groups of a sugar having five or six carbon atoms to a carbon having a hydroxyl group. A preferred reduced sugar having five carbon atoms is xylitol. Preferred six carbon atom reduced sugars are sorbitol and mannitol.

The polyhydroxyurethanes of the present invention are prepared from an excess of a reduced sugar of the above formula with an organic diisocyanate, usually in a molar ratio of at least 1.5:1, preferably at least 2.0:1. The reaction product is a polyhydroxyurethane of low molecular weight having many unreacted hydroxyl groups. Molecular weight is usually less than 1,500. A molecular weight of less than 1,000 is preferred. Among the diisocyanates that are suitable for preparing the low molecular weight polyhydroxy polyurethanes are common commercial diisocyanates, such as hexamethylene diisocyanate ("HMDI"), diphenylmethane 4,4'-diisocyanate ("MDI"), 4,4'-methylene-bis(cyclohexylisocyanate) ("PICM"), isophorone diisocyanate ("IPDI"), and 1,3-bis (1-isocyanato-1-methylethyl)benzene ("m-TMXDI"). The preferred diisocyanate for use in preparing the polyhydroxyurethanes of the present invention is m-TMXDI. The reactions between the reduced sugars and the diisocyanate can be carried out in the presence or absence of a solvent. However, the presence of a solvent, such as dimethylacetamide or dimethylformamide is preferred, in which case a mixture of reactants and solvent is heated in the range of 50° to 150° C. until all of the isocyanate groups have been reacted.

When used, to improve the resistance of spandex polymer to discoloration and degradation due to fumes and light, the polyhydroxyurethanes are generally present in an amount of 0.5 to 5.0 wt% of the spandex polymer.

The following examples are given to illustrate the invention, not to limit it.

EXAMPLE 1

A 500 cc, 4-necked flask equipped with a stirrer and a Chesapeake bearing to exclude air, thermometer with a Therm-O-Watch control, dropping funnel, heating mantel, condenser (vent), and nitrogen and vacuum facilitor was 176 g dimethylacetamide and 91 g sorbitol. The dropping funnel was charged with 75 g 4,4'-methylene-bis(cyclohexylisocyanate). The flask was evacuated and purged with nitrogen. A flow of nitrogen over the contents of the flask and through the vent. The contents of the flask were heated to 100°-102° C. The 4,4'-methylene-bis(cyclohexyliso cyanate) in the dropping funnel was added in five (5) 15 g increments at hourly intervals. The contents of the flask were stirred at 100°-102° C. for two hours after the last addition. A clear viscous solution resulted from which 47.9 wt% solids were recovered. The expected solids recovery was 48.5 wt%.

EXAMPLE 2

Example 1 was repeated except the charge to the flask was 176 g dimethylacetamide and 91 g mannitol. The charge to the dropping funnel was 69.55 g 4,4'-methylene-bis(cyclohexylisocyanate). The flask was evacuated, purged and flowed with nitrogen as in Example 1. The flask contents were heated to 100°-102° C. and the contents of the dropping funnel added in five 14 g increments at 1 to 1.5 hourly intervals. After the last addition, the contents of the flask were stirred at 100°-102° C. for four hours. The flask was cooled to room temperature and discharged. A clear viscous liquid results consulting 46.49% solids.

EXAMPLE 3

Example 1 was repeated except the charge to the flask was 162 g dimethylacetamide and 79 g xylitol. The charge to the dropping funnel was 86 g 4,4'-methylene-bis(cyclohexylisocyanate). The flask was evacuated and purged with nitrogen and nitrogen flowed over the contents of the flask and out the vent. The flask was heated to 100°-102° C. and the contents of the dropping funnel were added in four 21.5 g increments at 1 to 1.5 hour intervals. The contents of the flask were stirred for four hours at 100°-102° C. after the last addition. A clear viscous solution resulted.

EXAMPLE 4

Example 1 is repeated except the flask is charged with 176 g dimethylacetamide and 91 g sorbitol. The dropping funnel was charged with 55 g of isophoronediisocyanate. The flask was evacuated and purged with N² gas which was flowed out the vent. The contents of the flask were heated to 100°–102° C. and the contents of the dropping funnel were added in three 11 g portions at hourly intervals. After the remainder of isophorone diisocyanate was added and stirring continued for 5 hours at 100°–102° C., a clear yellow solution resulted having a solids content of 40.03 g.

EXAMPLE 5

Example 1 is repeated except the flask is charged with 176 g dimethyl acetamide, 91 g sorbitol and the dropping funnel with 60 g 1,3-bis(1-isocyanato-1-methylethyl)benzene (m-TMXDI). The flask was evacuated and flushed with nitrogen. The flask was heated to 100°–102° C. and the contents of the dropping funnel added in five 12 g increments at one hour intervals and heating continued for 4 hours at 100°–102° C. The IR showed no remaining unreacted isocyanate. The resulting product was a colorless liquid containing 41.32% solids.

EXAMPLE 6

A 1,000 ml 4 necked flask equipped with a stirrer with a Chesapeake air seal, a thermometer with a Therm-O-Watch, heating mantel, vacuum and nitrogen source was purged with nitrogen and charged with 162 g dimethylacetamide, 76 g xylitol and 85 g 4,4′-methylene-bis(cyclohexylisocyanate). The flask was purged with nitrogen after charging, heated to 100°–102° C. until the isocyanate peak disappeared after about 3 hours. There was 306 g of product containing 35.83% solids xylitol-methylene-bis(4-cyclohexylpoly urethane).

EXAMPLE 7

A 500 ml flask equipped with a stirrer, thermometer, heating mantel, vacuum and nitrogen source was charged with 56 g xylitol, 60 g m-TMXDI, 116 g dimethylacetamide and purged with nitrogen. The contents of the flask were heated to 100°–102° C. and held until the isocyanate peak disappeared in about 2 hours. There were 222 g of product which contained 40.14% solids. The expected solids content was 50%.

EXAMPLE 8

A 1,000 ml flask equipped with a stirrer, thermometer, heating mantel, vacuum and nitrogen source was charged with 251 g dimethylacetamide, 87 g toluene diisocyanate and 164 g sorbitol and purged with nitrogen. The contents of the flask were heated to 100°–102° C. and held for 3 hours at which point isocyanate was consumed. The solids content of the product solution was 36.5 wt%.

EXAMPLE 9

A 500 ml four necked flask equipped with a stirrer with a Chesapeake bearing, thermometer with Therm-O-Watch, dropping funnel, heating mantel, vacuum and nitrogen source. The flask was charged with 162 g dimethylacetamide and 79 g of xylitol and the dropping funnel with 86 g 4,4′-methylene-bis(cyclohexylisocyanate). The flask and dropping funnel were evacuated and purged with nitrogen. The contents of the flask were heated to 100°–102° C. 22 g of 4,4′-methylene-bis(cyclohexylisocyanate) were added to the flask with stirring at 100°–102° C. until the diisocyanate disappeared. The remaining contents of the dropping funnel were added in 20–22 g increments at 1.5 hourly intervals. The reaction mass was then held at 100° C. for 3 hours. There were 314 g of product containing 32.48% solids.

EXAMPLE 10

A 2,000 ml 4 necked flask equipped with a thermometer with a Therm-O-Watch, stirrer with a Chesapeake bearing, dropping funnel, heating mantel, vacuum and nitrogen source was charged with 750 ml dimethylacetamide and 470 g sorbitol and the dropping funnel with 300 g 1,3-bis(1-isocyanato-1-methylethyl)benzene (m-TMXDI). The flask and dropping funnel were evacuated and purged with nitrogen twice. The contents of the flask were then heated to 100°–102° C., and 60 g of the contents of the dropping funnel were added, the flask agitated at 100°–102° C. for 1.5 hours, this was repeated 3 times and then the final 60 g added and the flask agitated at 100°–102° C. for 4 hours. The contents of the flask were cooled to 40°–50° C. and discharged. The contents appeared to be yellower than the product of Example 5. The Brookfield viscosity of the product was 800–850.

EXAMPLE 11

Example 1 is repeated except the charge to the flask was 118 g dimethylacetamide and 57 g xylitol and the charge to the dropping funnel was 61 g m-TMXDI. The flask was evacuated and purged with nitrogen and continued nitrogen flow. The contents of the flask were heated to 100°–102° C. 16 g m-TMXDI were added and stirred for one hour, 15 g of m-TMXDI were added and stirred for 1 hour, 15 g m-TMXDI were added and stirred for one hour, 15 g m-TMXDI were added and stirred for 4 hours at 100°–102° C. There was 232 g of product containing 53.10% solids.

EXAMPLE 12

A 1,000 ml flask equipped with stirrer and Chesapeake bearing, thermometer with Therm-O-Watch, dropping funnel, heating mantel, vacuum, and nitrogen feed was charged with 332 g dimethylacetamide, 188 g sorbitol, and the dropping funnel with 69 g m-TMXDI and 75 g 4,4′-methylene-bis(cyclohexylisocyanate). The flask was purged nitrogen and heated to 100°–102° C. The contents of the dropping funnel were added to the flask in 36 g increments at hourly intervals. After the last addition, the flask was held at 100°–102° C. for 4 hours. It showed complete reaction of the diisocyanates.

EXAMPLE 13

Example 12 is repeated except the charge to the flask is 269 g dimethylacetamide and 152 g xylitol and the charge to the dropping flask is 69 g m-TMXDI and 75 g 4,4′-methylene-bis(cyclohexylisocyanate). The same procedure was followed as in Example 12 with similar results.

I claim:

1. Low molecular weight polyhydroxy urethanes having a molecular weight of less than about 1,500 consisting essentially of the reaction product of the hydroxyl groups of at least about a 1.5 molar excess of a reduced sugar of the formula $C_xH_{2(x+1)}O_x$ where x is 4, 5 or 6 and the isocyanate groups of a diisocyanate.

2. The low molecular weight polyhydroxy urethane of claim 1 wherein the reduced sugar is selected from the group consisting of sorbitol, xylitol and mannitol.

3. The low molecular weight polyhydroxy urethane of claim 2 wherein the diisocyanate is selected from the group consisting of hexamethylene diisocyanate, diphenylmethane 4,4'-diisocyanate 4,4'-methylene-bis-(cyclohexylisocyanate), isophorone diisocyanate, and 1,3-bis(l-isocyanatol-1-methylethyl)benzene.

4. The low molecular weight polyhydroxy urethane of claim 3 wherein at least about a 2.0 molar excess of reduced sugar is present.

5. The low molecular weight polyhydroxy urethane of claim 4 wherein the molecular weight is less than about 1,000.

6. The low molecular weight polyhydroxy urethane of claim 5 wherein the reduced sugar is mannitol.

7. The low molecular weight polyhydroxy urethane of claim 6 wherein the diisocyanate is 4,4'-methylene-bis-(cyclohexylisocyanate).

8. The low molecular weight polyhydroxy urethane of claim 5 wherein the reduced sugar is sorbitol.

9. The low molecular weight polyhydroxy urethane of claim 8 wherein the diisocyanate is 4,4'-methylene-bis-(cyclohexylisocyanate).

10. The low molecular weight polyhydroxy urethane of claim 8 wherein the diisocyanate is isophoronediisocyanate.

11. The low molecular weight polyhydroxy urethane of claim 8 wherein the diisocyanate is 1,3-bis(1-isocyanato-1-methylethyl)benzene.

12. The low molecular weight polyhydroxyl urethane of claim 8 wherein the diisocyanate is toluene diisocyanate.

13. The low molecular weight polyhydroxy urethane of claim 8 wherein the diisocyanate is a mixture of 4,4'-methylene-bis-(cyclohexylisocyanate) and 1,3-bis(1-isocyanato-1-methylethyl)benzene.

14. The low molecular weight polyhydroxy urethane of claim 5 wherein the reduced sugar is xylitol.

15. The low molecular weight polyhydroxy urethane of claim 14 wherein the diisocyanate is 4,4'-methylene-bis-(cyclohexylisocyanate).

16. The low molecular weight polyhydroxy urethane of claim 14 wherein the diisocyanate is 1,3-bis(1-isocyanato-1-methylethyl)benzene.

17. The low molecular weight polyhydroxy urethane of claim 14 wherein the diisocyanate is a mixture of 4,4'-methylene -bis(cyclohexylisocyanate) and 1,3-bis(1-isoctanato-1-methylethyl)benzene.

* * * * *